United States Patent [19]

Pan et al.

[11] Patent Number: 5,139,679
[45] Date of Patent: Aug. 18, 1992

[54] TREATMENT OF WASTEWATER CONTAINING CITRIC ACID AND TRIETHANOLAMINE

[75] Inventors: Bingham Y. K. Pan, Claremont; Teh F. Yen, Altadena; Jau R. Chen, Cypress, all of Calif.

[73] Assignee: The United States of America as represented by the Secretary of the Navy, Washington, D.C.

[21] Appl. No.: 840,207

[22] Filed: Feb. 24, 1992

[51] Int. Cl.$^5$ .......................... C02F 1/32; C02F 1/72
[52] U.S. Cl. ..................................... 210/656; 210/721; 210/722; 210/748; 210/759; 210/763; 210/908; 210/912
[58] Field of Search ............... 210/635, 638, 656, 748, 210/759, 763, 908, 721, 722, 702, 912, 913, 914

[56] References Cited

U.S. PATENT DOCUMENTS

| | | | |
|---|---|---|---|
| 3,819,516 | 6/1974 | Murchison | 210/763 |
| 4,294,703 | 10/1981 | Wilms | 210/763 |
| 4,363,215 | 12/1982 | Sharp | 210/763 |
| 4,549,969 | 10/1985 | Gerlach | 210/763 |
| 4,693,833 | 9/1987 | Toshikuni | 210/763 |
| 4,804,480 | 2/1989 | Jayawant | 210/763 |
| 4,861,484 | 8/1989 | Lichtin | 210/763 |
| 4,877,558 | 10/1989 | Morioka | 210/763 |
| 4,966,665 | 10/1990 | Ibusuki | 210/763 |
| 5,043,080 | 8/1991 | Cater | 210/763 |

*Primary Examiner*—Ernest G. Therkorn
*Attorney, Agent, or Firm*—David S. Kalmbaugh; Melvin J. Sliwka

[57] ABSTRACT

Process for treating wastewater containing citric acid and triethanolamine and heavy metals by subjecting the wastewater to treatment with hydrogen peroxide and ultraviolet light (UV) and in the presence of ferrous ion as catalyst, to substantially decompose the citric acid and the triethanolamine. Wastewater generated from ship bilge cleaning and containing up to 10% citric acid or up to 5% triethanolamine, or mixtures thereof, can thus be subjected to UV/$H_2O_2$ treatment with ferrous ion in a concentration thereof of about 20 to about 100 ppm, without forming chelates of iron and other heavy metals with citric acid or with triethanolamine, to decompose up to 90% or more of the citric acid and triethanolamine.

18 Claims, No Drawings

TREATMENT OF WASTEWATER CONTAINING CITRIC ACID AND TRIETHANOLAMINE

BACKGROUND OF THE INVENTION

This invention relates to treatment of wastewater containing citric acid and/or triethanolamine generated from ship bilge cleaning operations, for disposal thereof, and is particularly concerned with the destruction and decomposition of the citric acid and triethanolamine in such wastewater.

One of the regular maintenance tasks for surface ships is ship bilge cleaning. For this purpose, solutions containing citric acid and triethanolamine are employed, e.g. to remove old paint and rust from bilges for cleaning and repainting same. Solutions of different citric acid and triethanolamine concentrations are employed, some having a relatively high concentration of these chemical agents, e.g. 10% citric acid and 5% triethanolamine, by weight, and some being more dilute, e.g. containing 5% citric acid and 2% triethanolamine. Also, final rinse solutions can be employed, e.g. containing only citric acid or only triethanolamine.

The wastewater produced in these operations contains in addition to citric acid and/or triethanolamine, heavy metal ions sludge, and oil and grease. Existing industrial waste treatment plants (IWTP) cannot treat effectively such wastewater to remove heavy metal ions and destroy citric acid and triethanolamine, since these chemical agents will chelate without being precipitated out, and the heavy metals or metal ions in the wastewater are generally considered toxic, and hence wastewater containing such materials cannot be sewered. Thus, for example, citric acid and triethanolamine-containing wastewater is simply diluted and hauled away for land disposal. However, the naval shipyards as the producers of the hazardous wastewater are liable for its final safe disposal.

Also, currently, industrial wastewater treatment plants at naval shipyards treat very dilute wastewaters containing only about 1% citric acid and 1% triethanolamine with potassium permanganate but this process produces considerable heat, requiring treatment of the wastewater over an extended period of time, e.g. 3 or 4 days, and results in the generation of an undesirable brown manganese dioxide precipitate in the sludge, and is a high cost operation. Concentrated wastewater containing about 10% citric acid and about 5% triethanolamine cannot be treated in this manner and must be disposed of by contractor hauling.

Ultraviolet light and hydrogen peroxide ($H_2O_2$) techniques have been used heretofore to destroy hazardous organic chemicals such as benzene, trichloroethylene, dichloromethane and other halogenated aliphatics. However, such method is known to be generally effective on such organic compounds present in solution only in very low concentrations substantially below 1%, usually in the range of several hundred mg/l (ppm).

One object of the present invention is the destruction of citric acid and/or triethanolamine from wastewater, particularly wastewater employed in ship bilge cleaning operations, so that the toxic heavy metals also present will no longer form chelated compounds and subsequently can be removed from the watewater in IWTP by conventional precipitation procedure by adjusting the pH within a suitable range.

Another object is to treat the above citric acid and/or triethanolamine containing wastewater in a manner so as to decompose such materials into innocuous forms.

Still another object is to decompose substantially all of the citric acid and triethanolamine in wastewater containing relatively high concentrations of such materials, in an efficient cost effective process.

SUMMARY OF THE INVENTION

It has been found that wastewater from ship bilge cleaning operations, containing relatively high concentrations of citric acid and triethanolamine can be successfully treated to decompose more than 90% of both the citric acid and triethanolamine, by treatment of the wastewater with ultraviolet light and hydrogen peroxide, with the addition of minor amounts of ferrous ion as catalyst to the wastewater.

The ferrous ion, e.g. in the form of a soluble ferrous salt, is added to the wastewater, in sufficient amount, but in concentrations without forming chelates of ferric iron or other heavy metal ions which may be present in the wastewater, with citric acid or with triethanolaminer. Thus, it has been found that certain maximum concentrations of ferrous ion should be maintained, depending on the concentration of citric acid and triethanolamine in the wastewater, in the above ultraviolet light/hydrogen peroxide process for decomposing the citric acid and triethanolamine. Also, other perimeters which are significant in the process include hydrogen peroxide concentration, temperature of the reaction, intensity of ultraviolet light, and reaction time for the effective destruction of the citric acid and triethanolamine in the wastewater according to the invention.

The process of the invention can be practiced as a batch operation or as a continuous process.

DETAILED DESCRIPTION OF THE INVENTION AND PREFERRED EMBODIMENTS

According to the invention, ferrous ion has been found to catalyze the decomposition of a high concentration of up to 10% citric acid and up to 5% triethanolamine in wastewater containing citric acid and/or triethanolamine by the ultraviolet light/hydrogen peroxide reaction.

The ultraviolet light/hydrogen peroxide ($UV/H_2O_2$) reaction for decomposition of citric acid in the presence of ferrous ion is a relatively complex free radical reaction and oxidation reaction which results chiefly in the production of carbon dioxide, with small amounts of other compounds such as acetic acid, succinic acid, oxalic acid, malonic acid and formic acid. The $UV/H_2O_2$ decomposition reaction of triethanolamine in the presence of ferrous ion catalysts is also a relatively complex reaction which results chiefly in the production of carbon dioxide and nitrogen, with small amounts of other compounds such as monoethanolamine, diethanolamine, and acetaldehyde.

The small amounts of other substances, such as suspended solids and oil remaining in the treated wastewater are innocuous and the treated wastewater can then be discharged to sewers at that point or later, following removal of any heavy metal ions remaining in the wastewater. Thus it is not necessary in the above reactions to oxidize the citric acid completely to $CO_2$, or to oxidize the triethanolamine completely to $CO_2$ and $N_2$.

The photolysis apparatus for carrying out the $UV/H_2O_2$ reaction according to one embodiment, can consist of an ultraviolet light source such as a 450 watt medium-pressure mercury vapor Hanovia lamp, inserted into a water-cooled quartz immersion well, and the entire assembly fitted into the upper portion of a reactor. The reactor is open to the atmosphere to vent gasses generated in the reaction and to allow for expansion of the exothermic reaction. The requisite amount of $H_2O_2$ and a source of ferrous ion are added to the wastewater solution containing citric acid and/or triethanolamine, and the resulting mixture is charged to the reactor.

If desired, the apparatus can be modified to adapt it to a continuous flow process wherein the wastewater starting mixture containing added $H_2O_2$ and ferrous ion is continuously fed or pumped into the bottom of the reaction vessel and the flow rate is controlled so as to permit discharge of the treated reaction mixture containing the decomposition products of citric acid and/or triethanolamine, as overflow near the top of the reactor. The flow rate of the reaction mixture is maintained relatively constant by suitable pumping means.

The source of ferrous ion catalyst can be any suitable soluble ferrous compound such as ferrous sulfate, ferrous chloride, ferrous ammonium sulfate or ferrous acetate.

It has been found that for wastewater containing concentrations of up to 10% citric acid, e.g. about 1 to about 10% citric acid, or up to 5% triethanolamine, e.g. about 1 to about 5% triethanolamine, or mixtures thereof, concentrations of ferrous ion catalyst added to the wastewater and which avoid formation of chelating complexes of ferric iron, and other heavy metals present in the wastewater, with citric acid and/or triethanolamine, range from about 20 to about 100 ppm (mg/l). The maximum non-chelating ferrous ion concentration for a particular wastewater solution varies with and depends upon whether the wastewater contains only citric acid, or only triethanolamine, or mixtures of these two components.

The amounts or concentrations of citric acid and triethanolamine in the wastewater can be estimated by various known techniques, but no really accurate method has been developed, to date. As an additional feature of the present invention it has been found that citric acid and triethanolamine analysis, or concentration of citric acid and triethanolamine in the wastewater can be most accurately achieved by ion chromatography (IC) procedure. For this purpose, however, different columns and suppressors are required to achieve the separation and determine the quantity of the components.

In the case of citric acid, a so-called ion chromotography-exclusion (ICE) method is employed. This method utilizes a high performance (HP) ICE utilizing an ASI separator column and ISC suppressor in the Model 2000i ion chromotograph manufactured by Dionex Company, the solvent being, for example, 0.005 M HCl with a flow rate of 0.8 ml/minute. This technique provides separation based on differences in equilibrium constants (pka) and ion size. A conductivity detector is employed. The system pressure is maintained at 500 psi.

In the case of triethanolamine, an ion chromotography method is employed utilizing a HPIC-CGI cation guard, a HPIC-CSI cation separator column and a CSC-2 cation suppressor, the solvent being, for example 0.006 M HCl with a flow rate of 3.0 ml/minute. Other conditions are the same as those for the citric acid analysis.

It should be noted that the above columns, suppressors and other apparatus components are commercially available, but the above described techniques employing such pieces of equipment in combination for analyzing citric acid and triethanolamine in the wastewater at the above specified conditions are novel, to applicants' knowledge.

The amount or volume of $H_2O_2$ employed in the reaction mixture depends on the concentration of citric acid and/or triethanolamine in the wastewater solution. It has been found that in wastewater solutions containing about 1 to about 10% citric acid and/or about 1 to about 5% triethanolamine, or mixtures thereof, the amount of hydrogen peroxide added to the wastewater for reaction with citric acid and/or triethanolamine in the presence of ultraviolet light can range from about 30 ml to about 300 ml per liter of the wastewater solution. The greater the amount of the citric acid and/or triethanolamine, the greater the amount of $H_2O_2$ employed. In preferred practice, about 50 to about 100 ml of $H_2O_2$ is employed per liter of wastewater. The hydrogen peroxide can be supplied commercially, for example in the form of a 30% by weight solution, marketed by Mallinckrodt.

The intensity of the UV radiation employed in the reaction can range from about 400 to about 500 watts per liter. The intensity of the UV radiation is adjusted in relation to the volume or concentration of $H_2O_2$ added to the wastewater solution, so as to prevent too high a generation of heat with possible explosion hazard.

In this respect, the temperature range of the UV/-$H_2O_2$ reaction generally is between about 25° C. and 45° C. Cooling water is utilized to prevent the temperature from becoming excessive in the exothermic reaction, the cooling water temperature, for example, being about 25° C., and the flow rate of the cooling water being such as to maintain the above noted temperature range during the reaction.

The residence time or the time of reaction for the UV/$H_2O_2$ reaction utilizing ferrous ion according to the invention, can range from about 30 minutes to about 90 minutes. However, the residence time can of course vary and can be increased, e.g. up to about 150 minutes, again depending upon the concentration of citric acid and/or triethanolamine in the wastewater, the amount of $H_2O_2$ and ferrous ion catalyst employed and the intensity of the UV radiation. The residence time and temperature should of course be adjusted to avoid a dangerous rate of reaction.

The pH of the reaction mixture can range from about 2.0 to about 4.0. Under such acid conditions, after the reaction is completed for decomposition of substantially all of the citric acid and/or triethanolamine in the wastewater, an alkali such as alkali metal hydroxide, e.g. sodium hydroxide, can be added to the treated wastewater in an amount sufficient to raise the pH to approximately neutral. The wastewater can then be discharged safely to an IWTP for removal of heavy metal ions such as Cd, Cr, Pb, and sludge. For substantial removal of Cd, Cr Pb and other heavy metal ions, an alkali in the form of an alkali metal hydroxide or an alkaline earth metal hydroxide, such as NaOH or Ca-$(OH)_2$, can be added to the resulting wastewater in an amount sufficient to raise the pH of the wastewater to between 9 and 11, e.g. about 10. This causes precipitation of the heavy metal ions in the form of their insoluble hydroxides. Such treatment substantially reduces the concentration of metal ions in the wastewater.

The precipitates from the metal ions and the sludge which may also be present can be removed from the resulting wastewater by settling the solids and filtering the wastewater from the tank or container. The resulting lowered metal concentrations and sludge in the treated wastewater, as well as the absence of citric acid and/or triethanolamine therein generally renders the treated wastewater in compliance with regulations for discharge limits so as to permit discharge of the treated wastewater to sewers. The metal precipitates and sludge removed from the wastewater can be disposed of as the filter cake with passage of the filtrate to sewers.

The following are examples of practice of the invention process:

EXAMPLE 1

A simulated wastewater consisting of 8% citric acid, 4% triethanolamine and 2000 ppm ferric ion (iron) is first introduced into a reactor vessel having a water cooled 450 watt mercury vapor lamp mounted therein, as described above.

A ferrous sulfate solution is first introduced into the reactor vessel to provide ferrous ion and appropriate amounts of hydrogen peroxide (as indicated below) for two cases is added slowly to the reaction vessel to avoid a violent reaction.

The amounts of ferrous ion and hydrogen peroxide provided for the respective cases is as follows:

| Case | Ferrous ion (ppm) | Hydrogen Peroxide (ml/1000 ml wastewater) | Average pH of reaction mixture |
| --- | --- | --- | --- |
| 1 | 20 | 375 | 3.0–4.0 |
| 2 | 20 | 500 | 3.0–4.0 |

In each case, the mixture of wastewater sample in the amount of 1,000 mls, ferrous ion in the form of ferrous sulfate and $H_2O_2$ are stirred thoroughly for 10 minutes before the application of UV radiation.

Residence time of the reaction is about 120 minutes. The temperature range of the reaction mixture is maintained between about 25° C. and 45° C.

In each case a 20 ml sample is withdrawn at intervals during the reaction. The average pH of the reaction mixture during these runs is shown in the table After completion of the reaction and withdrawal of the reaction mixture in each case from the reactor, the respective samples are analyzed for remaining content of citric acid and triethanolamine in each sample. More than reduction of both citric acid and triethanolamine are achieved in each case.

The two samples are also analyzed for the presence of chelates of citric acid and iron and chelates of triethanolamine and iron. No such chelates are found. This indicates that high concentrations of citric acid and triethanolamine in the presence of a large amount of iron (2000 ppm) in the tested wastewater samples can be decomposed and removed from the wastewater using a 20 ppm concentration of ferrous ion as catalyst, without formation of deleterious citric acid-iron and triethanolamine-iron chelates, which would hold the iron in solution to prevent the iron from being subsequently removed by precipitation.

EXAMPLE 2

A wastewater from a ship bilge cleaning operation has the following composition:

| Components | |
| --- | --- |
| Citric acid | 7.06% |
| Triethanolamine | 4.25% |
| pH | 2.50 |
| Metals | mg/l (ppm) |
| Arsenic | 1.0 |
| Barium | 1.0 |
| Cadmium | 1.4 |
| Chromium | 8.0 |
| Iron (ferric) | 109.8 |
| Lead | 24.0 |
| Mercury | 0.05 |
| Selenium | 0.1 |
| Silver | 0.5 |
| Oil and grease | 42.0 |
| Suspended solids | 95 |

The above wastewater composition is subjected to ultraviolet light-hydrogen peroxide treatment after initial introduction of ferrous sulfate into the wastewater, substantially as described in Example 1 above.

In the present example ferrous sulfate in an amount furnishing 20 ppm of ferrous ion is employed and an amount of 300 ml/l of $H_2O_2$ is utilized. Temperature of the reaction and residence time is about the same as in Example 1.

At completion of the reaction substantially all of the critic acid and the triethanolamine are removed from the wastewater with no indication of the formation of chelates of citric acid or tirethanolamine with ferric iron or the other heavy metals noted above in the wastewater.

The concentrations of citric acid and triethanolamine in the wastewater both initially and after completion of the reaction are measured by ion chromatography as described above.

An amount of sodium hydroxide is added to the treated wastewater such as to increase the pH of the solution to about 10, and precipitating the metal ions in solution. The precipitates, suspended solids and a small amount of oil and grease are removed from the wastewater by settling and filtration, and the wastewater, substantially free of citric acid and triethanolamine, heavy metals and suspended solids can be sewered From the foregoing, it is seen that the invention provides a simple efficient process for removal of citric acid and triethanolamine in wastewater from ship bilge cleaning operations by subjecting the wastewater to ultraviolet light/hydrogen peroxide treatment using ferrous ion as catalyst without forming metal chelates in the solution. The result is that the so treated wastewater is rendered non-hazardous and can be sewered. Further, the invention process produces little or no undesirable precipitate as in the current treatment method using potassium permanganate, which results in a large quantity of hazardous precipitate containing a substantially high concentration of $MnO_2$. The process of the present invention is relatively simple and cost effective.

Since various changes and modifications can be made in the invention without departing from the spirit thereof, the invention is not to be taken as limited except by the scope of the appended claims.

What is claimed is:

1. A process for treating wastewater containing a mixture of citric acid and triethanolamine, which comprises adding hydrogen peroxide and a source of ferrous ion as catalyst to said wastewater, and subjecting the resulting mixture to exposure to a source of ultraviolet light for a period sufficient to cause a reaction and to decompose at least a substantial portion of the citric acid and triethanolamine in the wastewater.

2. The process of claim 1, said wastewater also containing at least one heavy metal ion, the concentration of ferrous ion being such as to avoid forming chelates of said at least one heavy metal ion with citric acid or with triethanolamine.

3. The process of claim 2, said at least one heavy metal being ferric iron.

4. The process of claim 2, and including subjecting said wastewater after decomposition of the citric acid and triethanolamine, to treatment with an alkali to cause precipitation of said at least one heavy metal ion, and removing the precipitate from the treated wastewater.

5. The process of claim 1, including maintaining the reaction mixture in a temperature range of between about 25° and 45° C. by cooling.

6. The process of claim 5, the time of reaction ranging from about 30 minutes to about 150 minutes, and the pH of the reaction mixture ranging from about 2.0 to about 4.0

7. The process of claim 1, the amount of hydrogen peroxide employed being effective in conjunction with said ultraviolet light and said ferrous ion, to cause said reaction for the substantial decomposition of said citric acid and said triethanolamine.

8. The process of claim 7, the amount of hydrogen peroxide in the reaction mixture ranging from about 30 ml to about 150 ml per liter of wastewater.

9. The process of claim 1, said wastewater containing, by weight, about 1 to about 10% citric acid or about 1 to about 5% triethanolamine, or mixtures thereof.

10. The process of claim 9, the concentration of ferrous ion in said wastewater ranging from about 20 to about 100 ppm.

11. The process of claim 9, the amounts of citric acid and of triethanolamine in the wastewater being determined by ion chromatography.

12. The process of claim 9, the amount of hydrogen peroxide in the reaction mixture ranging from about 50 to about 100 ml per liter of wastewater.

13. The process of claim 1, said wastewater obtained from ship bilge cleaning operations and containing, by weight, about 8% citric acid or about 4% triethanolamine, or a mixture of about 8% citric acid and about 4% triethanolamine, and also including ferric iron and other heavy metal ions, the concentration of ferrous ion ranging from about 20 to about 100 ppm.

14. The process of claim 13, the amounts of citric acid and of triethanolamine in the wastewater being determined by ion chromatography.

15. The process of claim 14, the ion chromatography method for citric acid utilizing a separator column and a suppressor, and for triethanolamine utilizing a cation guard, a cation separator column and a cation suppressor.

16. The process of claim 13, the amount of hydrogen peroxide in the reaction mixture ranging from about 50 to about 100 ml per liter of wastewater, including maintaining the reaction mixture at a temperature range of between about 25° and 45° C. by cooling, and the time of reaction ranging from about 30 minutes to about 150 minutes.

17. The process of claim 1, the reaction taking place in a water cooled reactor, vented to the atmosphere, said source of ultraviolet light being a mercury vapor lamp mounted in said reactor.

18. The process of claim 1, said process being carried out as a continuous process, said wastewater containing hydrogen peroxide and said source of ferrous ion being passed continuously through a reactor wherein said source of ultraviolet light is maintained within the reactor and is subjected to cooling during the passage of said wastewater through said reactor.

* * * * *